(12) United States Patent
Takaki et al.

(10) Patent No.: US 11,643,977 B2
(45) Date of Patent: May 9, 2023

(54) GAS TURBINE CONTROL DEVICE, GAS TURBINE CONTROL METHOD, AND PROGRAM

(71) Applicant: Mitsubishi Hitachi Power Systems, Ltd., Kanagawa (JP)

(72) Inventors: Kazushige Takaki, Tokyo (JP); Akihiko Saito, Tokyo (JP); Ryuji Takenaka, Yokohama (JP); Yoshifumi Iwasaki, Yokohama (JP); Koshiro Fukumoto, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/647,897

(22) PCT Filed: Oct. 18, 2018

(86) PCT No.: PCT/JP2018/038897
§ 371 (c)(1),
(2) Date: Mar. 17, 2020

(87) PCT Pub. No.: WO2019/078309
PCT Pub. Date: Apr. 25, 2019

(65) Prior Publication Data
US 2020/0217252 A1    Jul. 9, 2020

(30) Foreign Application Priority Data

Oct. 18, 2017  (JP) .............................. JP2017-201965

(51) Int. Cl.
*F02C 9/28* (2006.01)
*F02C 3/04* (2006.01)
*F02C 7/228* (2006.01)

(52) U.S. Cl.
CPC .................. *F02C 9/28* (2013.01); *F02C 3/04* (2013.01); *F02C 7/228* (2013.01);
(Continued)

(58) Field of Classification Search
CPC .... F02C 3/04; F02C 7/228; F02C 9/28; F23N 2241/20; F05D 2270/301; F05D 2270/303
See application file for complete search history.

(56) References Cited

U.S. PATENT DOCUMENTS 5,379,584 A * 1/1995 Windish .................... F02C 9/28
60/204
5,447,023 A * 9/1995 Meisner .................... F02C 9/28
60/39.26
(Continued)

FOREIGN PATENT DOCUMENTS

| CN | 1703574 | 11/2005 |
| JP | 2003-293795 | 10/2003 |

(Continued)

OTHER PUBLICATIONS

International Search Report dated Dec. 25, 2018 in International (PCT) Application No. PCT/JP2018/038897 with English-language translation.
(Continued)

*Primary Examiner* — Loren C Edwards
(74) *Attorney, Agent, or Firm* — Wenderoth, Lind & Ponack, L.L.P.

(57) ABSTRACT

A flow rate per unit time of fuel fed to a gas turbine is calculated. A flow rate per unit time of air fed to the gas turbine is calculated. A turbine inlet temperature is calculated through use of a physical model formula expressing a relationship of input and output of thermal energy relating to a combustor of the gas turbine. A fuel distribution ratio for each of a plurality of fuel supply systems connected to the (Continued)

combustor is calculated based on the turbine inlet temperature.

6 Claims, 4 Drawing Sheets

(52) U.S. Cl.
    CPC .. *F05D 2270/301* (2013.01); *F05D 2270/303* (2013.01); *F23N 2241/20* (2020.01)

(56) References Cited

U.S. PATENT DOCUMENTS

| | | | |
|---|---|---|---|
| 2005/0114010 A1 | 5/2005 | Healy et al. | |
| 2006/0005526 A1* | 1/2006 | Tanaka | F02C 9/00 60/39.27 |
| 2008/0243352 A1 | 10/2008 | Healy | |
| 2014/0260293 A1* | 9/2014 | Chen | F02C 9/28 60/773 |
| 2016/0326967 A1 | 11/2016 | Yamamoto et al. | |
| 2018/0223743 A1 | 8/2018 | Yamamoto et al. | |
| 2019/0063335 A1 | 2/2019 | Takaki et al. | |

FOREIGN PATENT DOCUMENTS

| | | |
|---|---|---|
| JP | 2005-155622 | 6/2005 |
| JP | 2013-160154 | 8/2013 |
| JP | 2015-161176 | 9/2015 |
| JP | 2016-23604 | 2/2016 |
| JP | 5995917 | 9/2016 |
| JP | 2017-44115 | 3/2017 |
| JP | 2017-106324 | 6/2017 |
| JP | 2017-160843 | 9/2017 |

OTHER PUBLICATIONS

Written Opinion of The International Searching Authority dated Dec. 25, 2018 in International (PCT) Application No. PCT/JP2018/038897 with English-language translation.

* cited by examiner

GAS TURBINE CONTROL DEVICE, GAS TURBINE CONTROL METHOD, AND PROGRAM

TECHNICAL FIELD

The present invention relates to a gas turbine control device, a gas turbine control method, and a program.

This application claims priority based on JP 2017-201965 A filed in Japan on Oct. 18, 2017, the contents of which are incorporated herein by reference.

BACKGROUND ART

In view of combustion efficiency and combustion stability, a gas turbine is required to supply fuel to a combustor, which forms the gas turbine for a plurality of fuel supply systems separately. In a related control method for the turbine, a turbine inlet temperature is estimated from heat balance data acquired at the time of design, and a ratio of distribution of fuel to each of the fuel supply systems (fuel distribution ratio; is determined based on the turbine inlet temperature. Further, there may be a risk of causing combustion oscillation depending on a relationship between the fuel distribution ratio and the turbine inlet temperature. The combustion oscillation damages the combustor and the like, and hence the oscillation is required to be suppressed.

JP 2015-161176 A discloses a method of calculating a turbine inlet temperature, based on a generator output and a fuel command value. However, in such turbine inlet temperature calculation method, there is a risk that an output value of the gas turbine cannot be calculated accurately based on a generator output particularly at the time of transient response in which the output fluctuates. As a result, accuracy is degraded. Further, in the technique in JP 2015-161176 A, a gas turbine output value, which is calculated based on a fuel control signal command value, is corrected, and a turbine inlet temperature is calculated through use of the corrected value. However, such corrected value is required to be adjusted appropriately so as to match with a gas turbine being a calculation target.

SUMMARY OF INVENTION

In view of this, the present invention has an object to provide a gas turbine control device, a gas turbine control method, and a program that can solve the above-described issues.

Solution to Problem

According to a first aspect of the present invention, a gas turbine control device includes a fuel flow rate calculation unit configured to calculate a flow rate per unit time of fuel led to a gas turbine, based on a measurement value of the gas turbine, an air flow rate calculation unit configured to calculate a flow rate per unit time of air fed to the gas turbine, based on a measurement value of the gas turbine, a turbine inlet temperature calculation unit configured to calculate a turbine inlet temperature by inputting, in a physical model formula expressing a relationship of balance of thermal energy relating to a combustor of the gas turbine, the flow rate per unit time of the fuel, the flow rate per unit time of the air, a fuel temperature, and an air temperature at a casing of the gas turbine, and a fuel distribution ratio calculation unit configured to calculate a fuel distribution ratio for each of a plurality of fuel supply systems connected to the combustor, based on the turbine inlet temperature.

The gas turbine control device described above may further include a correction unit configured to correct the turbine inlet temperature, based on a ratio of an exhaust gas temperature at the gas turbine and an exhaust gas temperature at the gas turbine calculated from the turbine inlet temperature. The fuel distribution ratio calculation unit may calculate the fuel distribution ratio, based on a turbine inlet temperature post correction by the correction unit.

In the gas turbine control device described above, the correction unit may correct the turbine inlet temperature, based on a relationship between a rated exhausted gas temperature and a rated turbine inlet temperature.

In the gas turbine control device described above, the air flow rate calculation unit may calculate the flow rate per unit time of the air, obtained by subtracting an extracted air flow rate per unit time.

In the gas turbine control device described above, the turbine inlet temperature calculation unit may input humidity of the air in the physical model formula, and calculate the turbine inlet temperature.

In the gas turbine control device described above, the turbine inlet temperature calculation unit may calculate the turbine inlet temperature through use of a specific enthalpy changed in accordance with humidity of air.

In the gas turbine control device described above, the air flow rate calculation unit may calculate an extracted air flow rate per unit time in accordance with an elapsed time after activation of the gas turbine, and calculate the flow rate per unit time of the air, obtained by subtracting the extracted air flow rate.

The gas turbine control device described above may further include a casing temperature calculation unit configured to calculate an air temperature at the casing, based on a measurement value of the gas turbine.

In the gas turbine control device described above, the physical model formula may be an abnormality physical model formula.

According to a second aspect of the present invention, a gas turbine control method includes, with a gas turbine control device, calculating a flow rate per unit time of fuel fed to a gas turbine, based on a measurement value of the gas turbine, calculating a flow rate per unit time of air fed to the gas turbine, based on a measurement value of the gas turbine, calculating a turbine inlet temperature by inputting, in a physical model formula expressing a relationship of balance of thermal energy relating to a combustor of the gas turbine, the flow rate per unit time of the fuel, the flow rate per unit time of the air, a fuel temperature, and an air temperature at a easing of the gas turbine, and calculating a fuel distribution ratio for each of a plurality of fuel supply systems connected to the combustor, based on the turbine inlet temperature.

According to a third aspect of the present invention, a program configured to cause a computer of a gas turbine control device to function as fuel flow rate calculation means for calculating a flow rate per unit time of fuel fed to a gas turbine, based on a measurement value of the gas turbine, air flow rare calculation means for calculating a flow rate per unit time of air fed to the gas turbine, based on a measurement value of the gas turbine, turbine inlet temperature calculation means for calculating a turbine inlet temperature by inputting, in a physical model formula expressing a relationship of balance of thermal energy relating to a combustor of the gas turbine, the flow rate per unit time of the fuel, the flow rate per unit time of the air, a fuel temperature, and an air temperature at a casing of the gas turbine, and fuel distribution ratio calculation means for calculating a fuel distribution ratio for each of a plurality of fuel supply systems connected to the combustor, based on the turbine inlet temperature.

Advantageous Effect of Invention

According to the present invention, the gas turbine control device is capable of calculating the turbine inlet temperature at higher accuracy even at the time of transient response in which the gas turbine output suddenly fluctuates. With this, the gas turbine control device is capable of calculating a fuel distribution ratio for each of the fuel supply systems in accordance with the turbine inlet temperature and capable of achieving stable combustion that suppresses generation of combustion oscillation of the gas turbine even at the time of transient response.

DESCRIPTION OF EMBODIMENTS

First Embodiment

In the following, description is made of a gas turbine control device according to a first embodiment of the present invention and a gas turbine power plant including the device with reference to the drawings.

Figure 1:
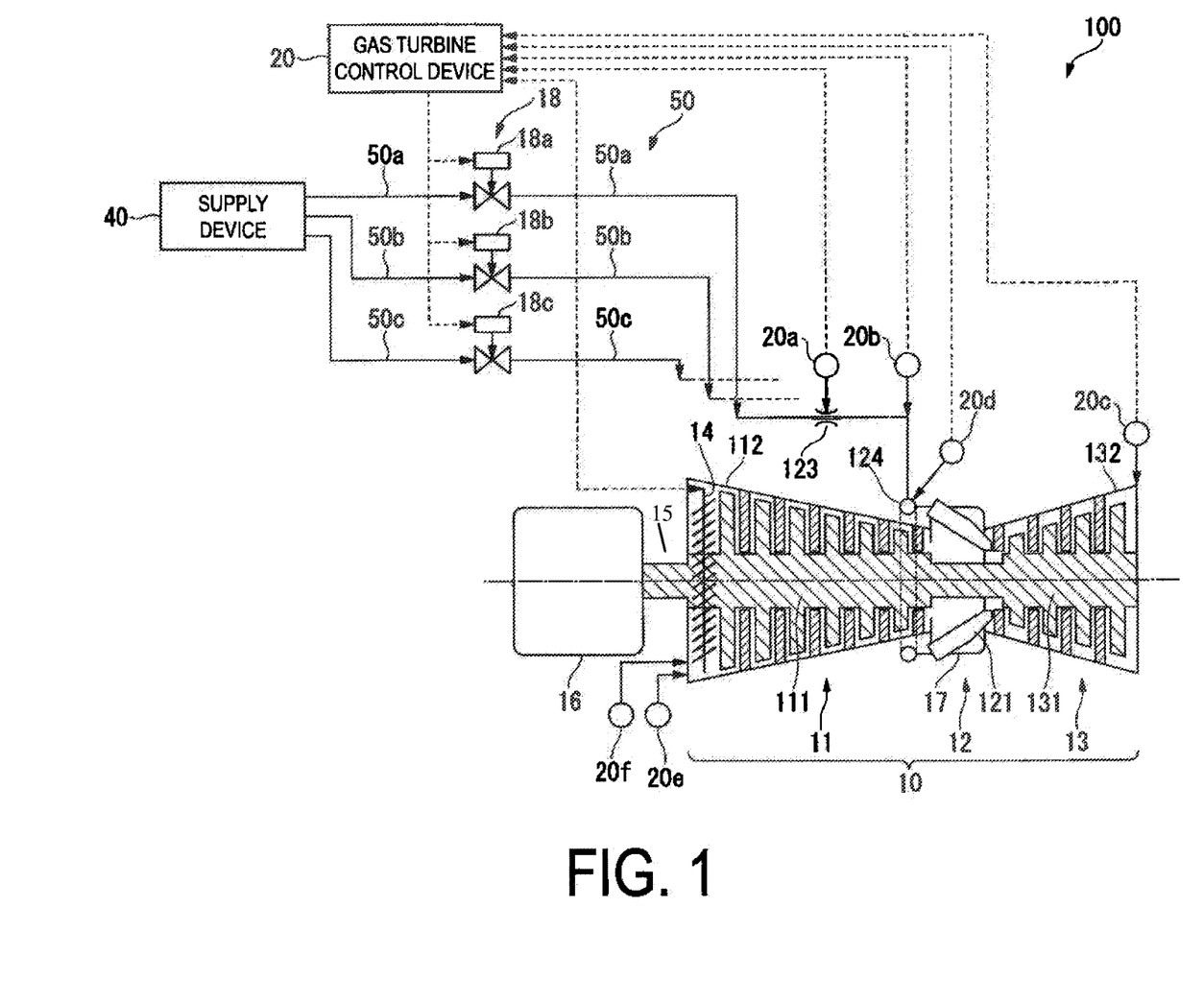
FIG. 1 is a system diagram of a gas turbine power plant.

FIG. 1 is a system diagram of the gas turbine power plant according to the present embodiment.

As illustrated in FIG. 1, a gas turbine power plant 100 in the present embodiment includes a gas turbine 10, a generator 16 that generates electricity by being driven by the gas turbine 10, a gas turbine control device 20 that controls the gas turbine 10, and a supply device 40 that supplies fuel. The gas turbine 10 and the generator 16 are connected by a rotor 15. Note that the gas turbine power plant 100 may be a gas turbine combined cycle power plant (GTCC) obtained by further including a steam turbine and the rotor 15 connected to the steam turbine.

The gas turbine 10 includes a compressor 11, a fuel supply system 50, a combustor 12, and a turbine 13.

The compressor 11 generates high-pressure compressed air by compressing external air. More specifically, the compressor 11 includes a compressor rotor 111 that rotates about a main axis line and a compressor casing 112 that covers the compressor rotor 111 from an outer circumferential side. The turbine 13 includes a turbine rotor 131 that rotates about the main axis line and a turbine casing 132 that covers the turbine rotor 131 from an outer circumferential side.

The compressor rotor 111 and the turbine rotor 131 are integrally connected to each other on the main axis line.

The combustor 12 generates high-temperature and high-pressure combustion gas by combusting fuel supplied from the fuel supply system 50 in the compressed air generated by the compressor 11. The combustor 12 includes a combustor internal cylinder 121 and a combustor casing 17 that covers the combustor internal cylinder 121. Further, the compressor casing 112, the combustor casing 17, and the turbine casing 132 are connected to each other.

The generator 16 is connected to one end of the compressor rotor 111. The generator 16 is driven by rotation of the compressor rotor 111, and thus generates power.

The fuel supply system 50 regulates a pressure and a flow rate of fuel supplied from the supply device 40. The fuel supply system 50 includes a regulating valve 18, a nozzle 123, and a manifold pipe 124. The regulating valve 18 is a pressure regulating valve, a fuel flow rate regulating valve, or the like.

Note that FIG. 1 illustrates a mode in which the gas turbine 10 includes fuel supply systems 50a, 50b, 50c, . . . . Further, FIG. 1 illustrates a mode in which, as the regulating valve 18, a first regulating valve 18a, a second regulating valve 18b, and a third regulating valve 18e, which regulate a fuel flow rate and a pressure for the fuel supply systems, respectively, are provided. FIG. 1 illustrates only three systems, including the fuel supply systems 50a, 50b, and 50c. However, the number of the fuel supply systems is not limited to three. For example, the gas turbine 10 may include a top hat fuel supply system that supplies fuel to a top hat portion of the combustor 12, a pilot fuel supply system that supplies fuel to a center portion of the internal cylinder of the combustor 12, and a main fuel supply system that supplies fuel to a portion surrounding the pilot fuel supply system in the internal cylinder of the combustor 12. Further. FIG. 1 illustrates only one combustor 12. However, a plurality of, for example, sixteen combustors 12 are provided, and fuel is supplied to the combustors 12 from the corresponding fuel supply systems 50a, 50b, 50c, . . . . As one example, in the gas turbine power plant 100, sixteen fuel supply systems 50 are connected to the corresponding combustors 12, respectively.

The gas turbine 10 is provided with a plurality of measuring instruments that measure state quantities of the gas turbine 10. As one example, the gas turbine 10 is provided with a fuel flow rate sensor 20a that measures a fuel flow rate at the fuel supply system 50, a nozzle flow rate sensor 20b that measures a passage flow rate (nozzle passage flow rate) at the nozzle 123, an exhaust gas flow rate sensor 20c that measures an exhaust gas flow rate, a manifold pressure sensor 20d that measures the pressure $P_{in}$ in the manifold pipe 124, a temperature sensor 20e that measures a compressor inlet temperature, an index pressure difference gauge 20f that measures a compressor index pressure difference $P_{index}$, and the like. Note that the compressor index pressure difference $P_{index}$ is a pressure difference between a pressure at a compressor suction port easing portion of the compressor 11 and a pressure in the vicinity of a blade inside the compressor, and is a value being an index of a flow rate of air sucked by the compressor. All of the fuel flow rate, the nozzle passage flow rate or the fuel valve passage flow rate, the exhaust gas flow rate, and the manifold pressure are state quantities of the gas turbine 10. Further, the gas turbine 10 is also provided with other measuring instruments. For example, the gas turbine 10 is provided with measuring instruments that measure a pressure $P_{out}$ at the combustor casing 17, a fuel temperature $T_f$, a casing air temperature $T_{cs}$, and an exhaust gas temperature $T_{2T}$. These are state quantities of the gas turbine 10.

Note that a turbine inlet temperature described below indicates a temperature at an inlet of the turbine 13 of combustion gas which has a high-temperature and is jetted from the combustor 12. The compressor 11 is provided with an inlet guide vane (IGV) 14. The IGV 14 regulates an amount of air flowing in the compressor 11.

Figure 2:
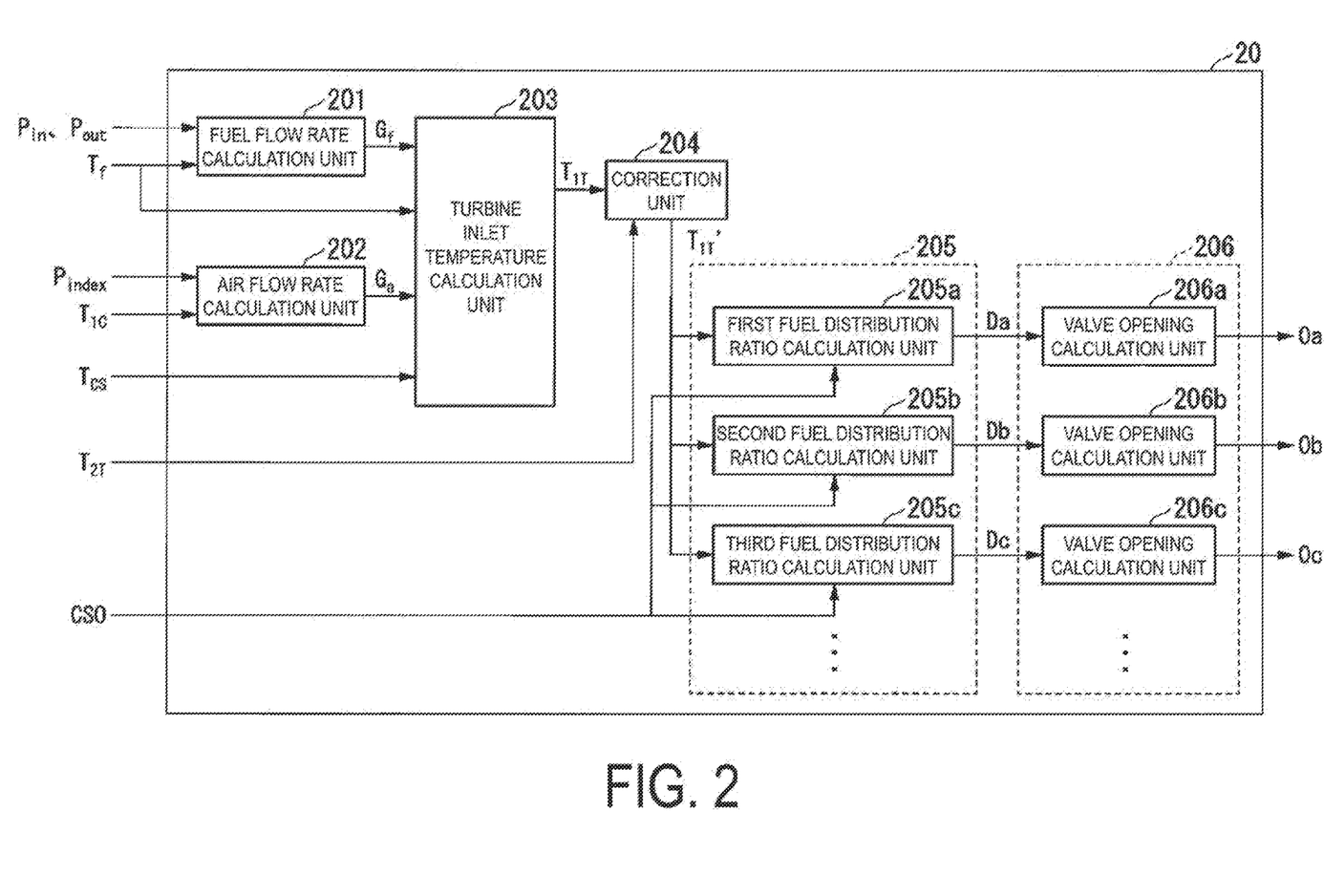
FIG. 2 is a function block diagram of a gas turbine control device according to a first embodiment.

FIG. 2 is a function block diagram of the gas turbine control device according to the first embodiment.

The gas turbine control device 20 is a computer, and may have a hardware configuration including a storage unit such as a read-only memory (ROM), a random access memory (RAM), and a hard disk drive (HDD), a central processing unit (CPU), a communication interface, and the like.

Based on a user operation, the CPU of the gas turbine control device 20 executes a stored control program. With this, the gas turbine control device 20 includes a fuel flow rate calculation unit 201, an air flow rate calculation unit 202, a turbine inlet temperature calculation unit 203, a correction unit 204, a fuel distribution ratio calculation unit 205, and a valve opening calculation unit 206. Note that the fuel distribution ratio calculation unit 205 includes a first fuel distribution ratio calculation unit 205a, a second fuel distribution ratio calculation unit 205b, a third fuel distribution ratio calculation unit 205c, and so on that calculate a fuel distribution ratio for the corresponding fuel supply systems. Further, the valve opening calculation unit 206 includes a first valve opening calculation unit 206a, a second valve opening calculation unit 206b, a third valve opening calculation unit 206c, and so on that calculate an opening amount for the corresponding fuel supply systems.

The fuel flow rate calculation unit 201 calculates a flow rate per unit time of fuel fed to the gas turbine 10, based on a measurement value of the gas turbine 10.

The air flow rate calculation unit 202 calculates a flow rate per unit time of air fed to the gas turbine 10, based on a measurement value of the gas turbine 10.

The turbine inlet temperature calculation unit 203 calculates a turbine inlet temperature through use of a physical model formula expressing a relationship of input and output of thermal energy relating to the combustor 12 of the gas turbine 10. In the physical model formula, a flow rate per unit time of the fuel, a flow rate per unit time of the air, a fuel temperature, and an air temperature at the easing of the gas turbine 10 are used.

The correction unit 204 calculates a correction factor for correcting the turbine inlet temperature, based on a ratio of the turbine inlet temperature and the acquired exhaust gas temperature at the gas turbine 10, and corrects the turbine inlet temperature with the correction factor.

Based on the corrected turbine inlet temperature, the fuel distribution ratio calculation unit 205 (205a, 205b, 205c, ...) calculates a fuel distribution ratio for each of the fuel supply systems that are correspondingly connected to the plurality of combustors 12.

Based on the fuel distribution ratio for each of the fuel supply systems, the valve opening calculation unit 206 (206a, 206b, 206c, ...) calculates an opening amount for each of the fuel supply systems.

In actuality, by executing the control program, the gas turbine control device 20 has functions in addition to the functional units illustrated in FIG. 2. However, for convenience of explanation, description is made only on the functional units illustrated in FIG. 2.

Figure 3:
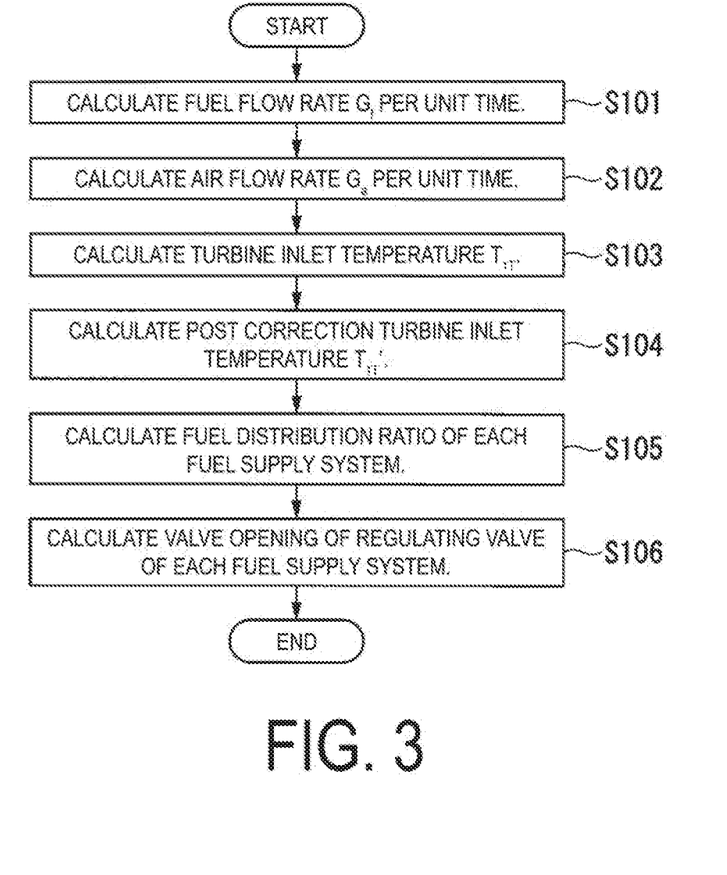
FIG. 3 is a process flowchart of the gas turbine control device.

FIG. 3 is a process flowchart of the gas turbine control device according to the present embodiment.

First, the fuel flow rate calculation unit 201 acquires the pressure $P_{in}$ at the manifold pipe 124, the pressure $P_{out}$ at the combustor casing 17, and the fuel temperature $T_f$. The pressure $P_{in}$ at the manifold pipe 124 is measured by the manifold pressure sensor 20d. Similarly, an outlet pressure $P_{out}$ and a fuel temperature $T_f$ at the fuel nozzle are measured by sensors. The fuel flow rate calculation unit 201 substitutes the pressure $P_{in}$ at the manifold pipe 124, the pressure $P_{out}$ at the combustor casing 17, and the fuel temperature $T_f$ in a fuel flow rate calculation formula (1), and calculates a total flow rate $G_f$ per unit time of the fuel fed to each of the combustors 12 of the gas turbine 10 as a first function of the above-noted parameters, as indicated below in Formula 1 (Step S101).

[Mathematical Formula 1]

$$G_f = f(P_{in}, P_{out}, T_f) \quad (1)$$

Further, the air flow rate calculation unit 202 acquires the compressor index pressure difference $P_{index}$ from the index pressure difference gauge 20f, and acquires a compressor inlet temperature $T_{1c}$ from the temperature sensor 20e. By measuring the index pressure difference $P_{index}$, a flow rate of air flowing through the compressor 11 can be calculated. The air flow rate calculation unit 202 substitutes the index pressure difference $P_{index}$ and the compressor inlet temperature $T_{1c}$ in an air flow rate calculation formula (2), and calculates a flow rate Ga per unit time of the air flowing in the compressor 11 as a second function of the above-noted parameters, as indicated below in Formula 2 (Step S102).

[Mathematical Formula 2]

$$G_a = f(P_{index}, T_{1C}) \quad (2)$$

The turbine inlet temperature calculation unit 203 acquires the fuel flow rate $G_f$ calculated by the fuel flow rate calculation unit 201. The turbine inlet temperature calculation unit 203 acquires the air flow rate $G_a$ calculated by the air flow rate calculation unit 202. The turbine inlet temperature calculation unit 203 further acquires the fuel temperature $T_f$. The turbine inlet temperature calculation unit 203 further acquires the casing air temperature $T_{cs}$ at the combustor casing 17. The air temperature $T_{cs}$ at the combustor casing is measured by a sensor. The turbine inlet temperature calculation unit 203 substitutes the fuel flow rate $G_f$, the air flow rate $G_a$, the fuel temperature $T_f$, and the casing air temperature $T_{cs}$ at the combustor casing 17 that are acquired in an abnormality physical model in the periphery of the combustor, which is indicated with a formula (3), and calculates a turbine inlet temperature $T_{1T}$ as a third function of the above-noted parameters, as indicated below in Formula 3 (Step S103). The turbine inlet temperature calculation unit 203 outputs the calculated turbine inlet temperature $T_{1T}$ to the correction unit 204. Note that the abnormality physical model expressed with formula (3) is obtained by rearranging a model formula, which indicates that thermal energy flowing in the combustor 12 is equivalent to thermal energy flowing out from the combustor 12, in such manner that the turbine inlet temperature $T_{1T}$ included in the model formula is put on the left side and other elements are put on the right side. The thermal energy flowing in the combustor 12 in the abnormality physical model is indicated with a total of thermal energy of fuel, thermal energy of air, and heat generation energy of combustion gas. Further, the thermal energy flowing out from the combustor 12 is indicated with the thermal energy at the inlet of the turbine 13. Here, the thermal energy of air is varied in accordance with a specific enthalpy in consideration with influence of humidity of steam contained in the air flowing in the combustor casing 17. Therefore, the turbine inlet temperature calculation unit 203 may acquire humidity of the air flowing in the combustor casing 17 with a sensor, calculate a specific enthalpy based on the humidity, and calculate the thermal energy of the air through use of the specific enthalpy.

[Mathematical Formula 3]

$$T_{1T} = f(G_f, G_a, T_f, T_{CS}) \quad (3)$$

Here, in actuality, the air flowing in the compressor 11 is extracted at a stage before flowing in the combustor 12. Thus, the air flow rate calculation unit 202 may calculate the air flow rate $G_a$ per unit time, obtained by subtracting a flow rate per unit time of the extracted air, and the turbine inlet temperature calculation unit 203 may calculate the turbine inlet temperature $T_{1T}$ with the above-described formula (3) using the air flow rate $G_a$ obtained by subtracting the extracted air flow rate. The extracted air flow rate is monotonically increased in accordance with increase in output value of the gas turbine 10 and value of the turbine inlet temperature $T_{1T}$. The air flow rate calculation unit 202 may calculate the extracted air flow rate through use of interpolation calculation with a data table indicating extracted air flow rates corresponding to output values of the gas turbine 10 and values of the turbine inlet temperature $T_{1T}$ and a predetermined calculation formula. Note that, when the extracted air flow rate is calculated based on the value of the turbine inlet temperature $T_{1T}$, the air flow rate calculation unit 202 may use the value of the turbine inlet temperature $T_{1T}$ that is calculated previously.

Here, immediately after the gas turbine 10 is actuated, the extracted air flow rate described above is also varied based on change of a shape of the compressor 11, the pipe, and the like due to thermal expansion and the like. Therefore, the air flow rate calculation unit 202 may calculate a highly accurate extracted air flow rate after activation through use of a correction formula for an extracted air flow rate per unit time in accordance with an elapsed time after activation of the gas turbine 10. Further, the turbine inlet temperature calculation unit 203 may calculate the turbine inlet temperature $T_{1T}$ through use of the air flow rate $G_a$ obtained by subtracting the highly accurate extracted air flow rate thus corrected.

The correction unit 204 may further correct the turbine inlet temperature $T_{1T}$, based on the exhaust gas temperature $T_{2T}$. Specifically, in advance, the gas turbine control device 20 stores information indicating a relationship of a rated exhaust gas temperature T4 at the time of rated operation of the gas turbine 10 and a rated turbine inlet temperature T5 at that time. The correction unit 204 acquires the information on the relationship of the rated exhaust gas temperature T4 and the rated turbine inlet temperature T5. The correction unit 204 calculates a correction value for the turbine inlet temperature $T_{1T}$, based on the relationship between the rated exhaust gas temperature T4 and the rated turbine inlet temperature T5. As one example, the correction unit 204 calculates a correction value for the turbine inlet temperature $T_{1T}$. The correction value satisfies that a value Tx obtained by subtracting the exhaust gas temperature $T_{2T}$ from the rated exhaust gas temperature T4 is equal to a value Ty obtained by subtracting the turbine inlet temperature $T_{1T}$ from the rated turbine inlet temperature T5 or is equal to a predetermined constant multiplication of a. Note that the relationship of the rated exhaust gas temperature T4 and the rated turbine inlet temperature T5 at that time may be varied due to a pressure at the combustor casing 17. In this case, the correction unit 204 acquires a pressure at the combustor casing 17 with a sensor, and uses the relationship of the rated exhaust gas temperature T4 and the rated turbine inlet temperature T5 at that time that are corrected based on the value of the pressure. In this manner, the correction value for the turbine inlet temperature $T_{1T}$ may be calculated as described above.

Here, the exhaust gas temperature $T_{2T}$ is a measurement value with slow reactivity with respect to change in output of the gas turbine 10. However, although having slow reactivity, the exhaust gas temperature $T_{2T}$ is highly accurate value. The exhaust gas temperature and the turbine inlet temperature have a strong correlation. Therefore, the correction unit 204 corrects the turbine inlet temperature $T_{1T}$ having fast reactivity that is obtained in Step S103 through use of the highly accurate exhaust gas temperature $T_{2T}$. Specifically, the correction unit 204 calculates an exhaust gas temperature estimation value $T_{4T}$, based on the turbine inlet temperature $T_{1T}$. The exhaust gas temperature estimation value $T_{4T}$ is an estimation value of an exhaust gas temperature in a case of assuming a temperature at the inlet of the turbine 13 as the turbine inlet temperature $T_{1T}$.

The correction unit 204 acquires the turbine inlet temperature $T_{1T}$, and inputs the turbine inlet temperature $T_{1T}$ to a predetermined calculation formula set in advance, and calculates an assumed exhaust gas temperature estimation value $T_{3T}$. This calculation formula is a formula for converting the turbine inlet temperature $T_{1T}$ into an exhaust gas temperature.

The correction unit 204 subjects the assumed exhaust gas temperature estimation value $T_{3T}$ to a process of delaying change of a value for each time, and calculates the exhaust gas temperature estimation value $T_{4T}$.

The correction unit 204 calculates a correction factor X4 that corrects the turbine inlet temperature $T_{1T}$, based on a ratio of the exhaust gas temperature $T_{2T}$ and the exhaust gas temperature estimation value $T_{4T}$ calculated from the turbine inlet temperature $T_{1T}$. In the present embodiment, as one example, the correction factor X4 is a value obtained by summing an adjustment ratio X2 and a past adjustment ratio X3. The adjustment ratio X2 is obtained by multiplying an adjustment coefficient α with a ratio X2 obtained by dividing the exhaust gas temperature $T_{2T}$ by the exhaust gas temperature estimation value $T_{4T}$. The past adjustment ratio X3 is obtained by multiplying 1−α with a past correction factor X4' being the correction factor X4 that is previously calculated. Further, the correction unit 204 calculates a post correction turbine inlet temperature $T_{1T}'$ by multiplying the turbine inlet temperature $T_{1T}$ with the correction factor X4 (Step S104). The correction factor X4 is a ratio of the exhaust gas temperature $T_{2T}$ to the exhaust gas temperature estimation value $T_{4T}$, and hence the post correction turbine inlet temperature $T_{1T}'$ is a value having high calculation accuracy in addition to fast reactivity by multiplying the turbine inlet temperature $T_{1T}$ with the correction factor X4. The gas turbine control device 20 determines a temperature of the combustion gas, based on the post correction turbine inlet temperature $T_{1T}'$ having fast reactivity and high calculation accuracy. Therefore, the gas turbine control device 20 is capable of calculating the post correction turbine inlet temperature $T_{1T}'$ having fast reactivity and high calculation accuracy. The correction unit 204 outputs the post correction turbine inlet temperature $T_{1T}'$ to the fuel distribution ratio calculation unit 205.

The fuel distribution ratio calculation unit 205 calculates a fuel distribution ratio for each of the fuel supply systems 50a, 50b, and 50c corresponding to the first fuel distribution ratio calculation unit 205a, the second fuel distribution ratio calculation unit 205b, and the third fuel distribution ratio calculation unit 205c, respectively (Step S105). The total of each fuel distribution ratio is 100%. A fuel distribution ratio for each of the fuel supply systems 50a, 50b, and 50c corresponding to the first fuel distribution ratio calculation unit 205a, the second fuel distribution ratio calculation unit 205b, and the third fuel distribution ratio calculation unit 205c, respectively, is calculated with a relationship formula of the post correction turbine inlet temperature $T_{1T}'$ and a fuel distribution ratio. Note that the fuel supply systems 50a, 50b, and 50c each may have a different corresponding relationship of the post correction turbine inlet temperature $T_{1T}'$ and a fuel distribution ratio. The first fuel distribution ratio calculation unit 205a, the second fuel distribution ratio calculation unit 205b, and the third fuel distribution ratio calculation unit 205c output the calculated opening amounts to the valve opening calculation unit 206. That is, the first fuel distribution ratio calculation unit 205a outputs a calculated fuel distribution ratio Da to the first valve opening calculation unit 206a. The second fuel distribution ratio calculation unit 205b outputs a calculated fuel distribution ratio db to the second valve opening calculation unit 206b. The third fuel distribution ratio calculation unit 205c outputs a calculated fuel distribution ratio Dc to the third valve opening calculation unit 206c.

The first valve opening calculation unit 206a, the second valve opening calculation unit 206b, and the third valve opening calculation unit 206c corresponding to the fuel supply systems 50a, 50b, and 50c, respectively, substitute fuel distribution ratios of the corresponding fuel supply systems and a fuel control command value CSO in an opening amount calculation formula, and calculates opening degrees of the first regulating valve 18a, the second regulating valve 18b, and the third regulating valve 18c of the corresponding fuel supply systems, respectively (Step S106). That is, the first valve opening calculation unit 206a calculates an opening amount Oa of the first regulating valve 18a, the second valve opening calculation unit 206b calculates an opening amount Ob of the second regulating valve 18b, and the third valve opening calculation unit 206c calculates an opening amount Oc of the third regulating valve 18c. The first valve opening calculation unit 206a outputs the calculated opening amount Oa to the first regulating valve 18a, the second valve opening calculation unit 206b outputs the calculated opening amount Ob to the second regulating valve 18b, and the third valve opening calculation unit 206c outputs the calculated opening amount Oc to the third regulating valve 18c. The first regulating valve 18a, the second regulating valve 18b, and the third regulating valve 18c are controlled to have the input opening amounts, respectively.

With the above-described process, an output value of the gas turbine 10 is not used for calculating the turbine inlet temperature. Instead, by substituting a measurement value having faster transient response in the abnormality physical model formula in the periphery of the combustor, the turbine inlet temperature is calculated. Therefore, even at the time of transient response in which output of the gas turbine 10 suddenly varies, an appropriate relationship of the turbine inlet temperature and the fuel distribution ratio can be maintained. Thus, stable combustion without causing combustion oscillation can be achieved.

Second Embodiment

Figure 4:
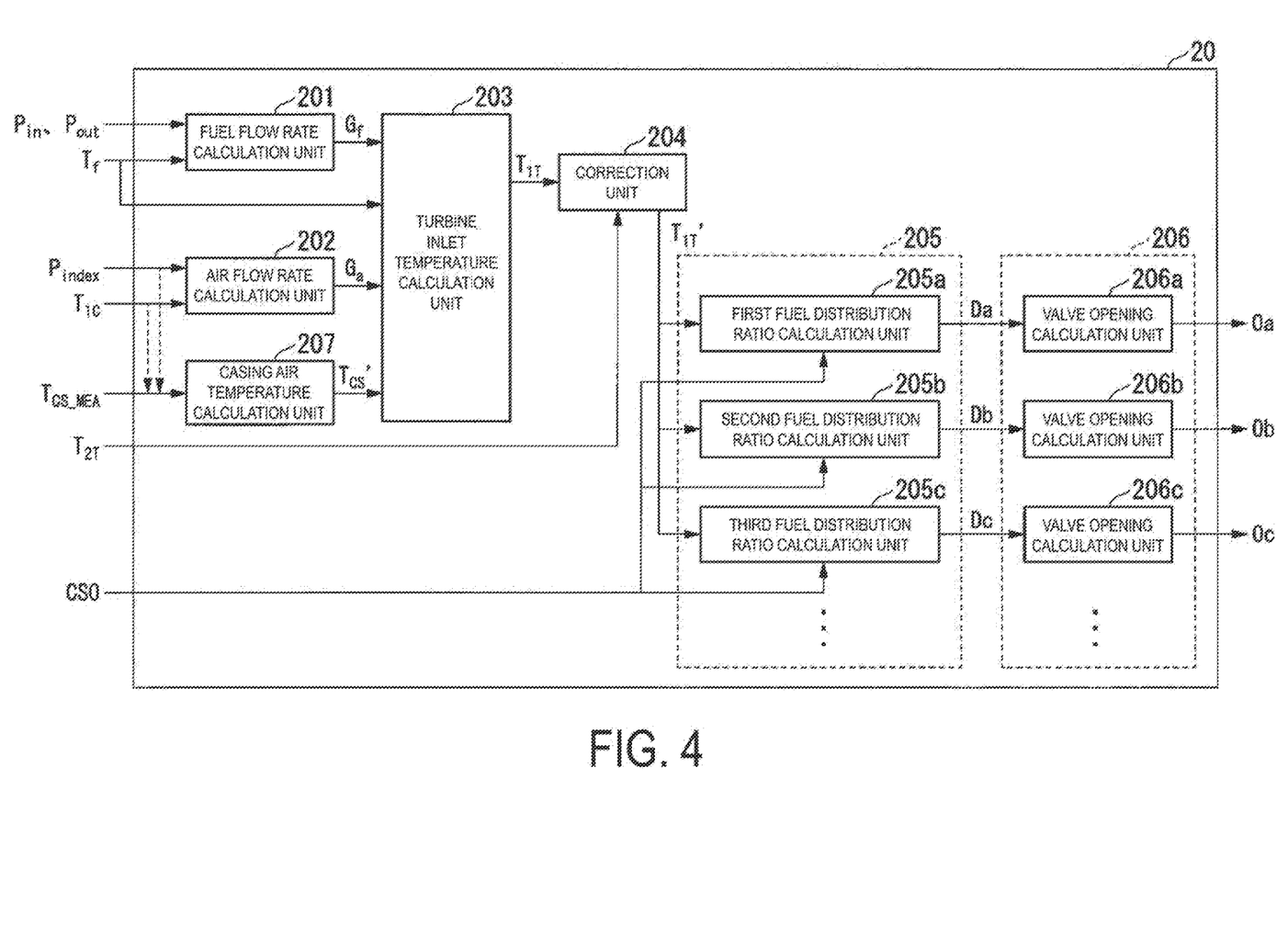
FIG. 4 is u function block diagram of a gas turbine control device according to a second embodiment.

FIG. 4 is a function block diagram of a gas turbine control device according to a second embodiment.

The gas turbine control device 20 may calculate a casing air temperature Tcs', based on a measurement value. In the second embodiment, the casing air temperature Tcs' is calculated by substituting values of a compressor inlet pressure $P_{1C}$ and a compressor outlet pressure $P_{2C}$ that are used for calculating the compressor index pressure difference $P_{index}$, the compressor inlet temperature $T_{1c}$e, and a casing air temperature measurement value $T_{CS\_MEA}$ in a casing air temperature calculation formula. The casing air temperature measurement value $T_{CS\_MEA}$ is generally measured along with time delay. Thus, the measurement value $T_{CS\_MEA}$ is not used as it is, and calculation with the above-described calculation formula for improving reactivity is performed. A casing air temperature calculation unit 207 substitutes the compressor inlet pressure $P_{1C}$, the compressor outlet pressure $P_{2C}$, the compressor inlet temperature $T_{1c}$, and the casing air temperature measurement value $T_{CS\_MEA}$ in a formula (4) being a physical model. With this, the casing air temperature Tcs' having fast reactivity can be calculated according to a fourth function as noted below (Math.4).

[Math. 4]

$$T_{CS}'=f(P_{1C},P_{2C},T_{1C},T_{CS\_MEA}) \qquad (4)$$

The above-described gas turbine control device 20 internally includes a computer system. Further, the steps of each process described above are stored in a computer readable recording medium in the form of a program, and the processes described above are implemented by the computer reading out and executing this program. Here, the computer readable storing medium refers to a magnetic disk, a magneto-optical disk, a CD-ROM, a DVD-ROM, a semiconductor memory, or the like. This computer program may be distributed to the computer on a communication line, and the computer that receives this distribution may execute the program.

Also, the program as described above may realize some of the functions described above. In addition, the functions as described above may be realized in combination with a program already stored on the computer system, namely, a so-called differential file (differential program).

REFERENCE SIGNS LIST

10 Gas turbine
20 Gas turbine control device
40 Supply device
201 Fuel flow rate calculation unit
202 Air flow rate calculation unit
203 Turbine inlet temperature calculation unit
204 Correction unit
205 Fuel distribution ratio calculation unit
206 Valve opening calculation unit

The invention claimed is:

1. A gas turbine control device for controlling a gas turbine including a compressor, a combustor, and a turbine, the gas turbine control device comprising a non-transitory memory and a processor configured to execute instructions stored in the memory, the memory and the processor being further configured to:
  calculate a fuel flow rate per unit time of a fuel fed to the combustor through a plurality of fuel supply systems according to a first formula including (i) a manifold pressure of the combustor, (ii) a pressure of a casing of the combustor, and (iii) a fuel temperature;
  calculate an air flow rate per unit time of an air flowing into the compressor according to a second formula including an index pressure difference and an inlet temperature of the compressor;

calculate a turbine inlet temperature according to a third formula including the fuel flow rate per unit time, the air flow rate per unit time, the fuel temperature, and an air temperature at the casing of the combustor, wherein the turbine inlet temperature reflects a specific enthalpy changed in response to an air humidity;

correct the turbine inlet temperature responsive to an exhaust gas temperature at the turbine to obtain a corrected turbine inlet temperature;

obtain a plurality of fuel distribution ratios for delivering fuel to the combustor through a plurality of fuel supply systems in response to obtaining the corrected turbine inlet temperature, and individually control a plurality of regulating valves attached to the plurality of fuel supply systems in response to the obtaining the plurality of fuel distribution ratios.

2. The gas turbine control device according to claim 1, wherein the memory and the processor are further configured to correct the turbine inlet temperature is by multiplying a correction factor according to a ratio of the exhaust gas temperature at the turbine and an exhaust gas temperature estimation value estimated from the turbine inlet temperature.

3. The gas turbine control device according to claim 1, wherein the memory and the processor are further configured to calculate the turbine inlet temperature according to the third formula using the air flow rate per unit time to be reduced by an extracted amount of air flow rate per unit time, the extracted amount of air flow being extracted before air flows into the combustor following the compressor.

4. The gas turbine control device according to claim 1, wherein the memory and the processor are further configured to calculate the air temperature at the casing of the combustor according to a fourth formula including an inlet pressure of the compressor and an outlet pressure of the compressor as well as the inlet temperature of the compressor and a measured air temperature of the casing of the combustor.

5. A gas turbine control method to be implemented by a gas turbine control device configured to control a gas turbine including a compressor, a combustor, and a turbine, the gas turbine control device including a non-transitory memory and a processor configured to execute instructions stored in the non-transitory memory, the non-transitory memory and the processor being further configured to perform the gas turbine control method comprising:

calculating a fuel flow rate per unit time of a fuel fed to the combustor through a plurality of fuel supply systems according to a first formula including (i) a manifold pressure of the combustor, (ii) a pressure of a casing of the combustor, and (iii) a fuel temperature;

calculating an air flow rate per unit time of an air flowing into the compressor according to a second formula including an index pressure difference, and an inlet temperature of the compressor;

calculating a turbine inlet temperature according to a third formula including the fuel flow rate per unit time, the air flow rate per unit time, the fuel temperature, and an air temperature at the casing of the combustor, wherein the turbine inlet temperature reflects a specific enthalpy changed in response to an air humidity;

correcting the turbine inlet temperature responsive to an exhaust gas temperature at the turbine to obtain a corrected turbine inlet temperature;

obtaining a plurality of fuel distribution ratios for delivering fuel to the combustor through a plurality of fuel supply systems in response to obtaining the corrected turbine inlet temperature; and individually controlling a plurality of regulating valves attached to the plurality of fuel supply systems in response to the obtaining the plurality of the fuel distribution ratios.

6. A non-transitory computer-readable storage medium including a stored program causing a computer to implement the gas turbine control method of claim 5.

* * * * *